United States Patent
Xu et al.

(10) Patent No.: US 8,924,784 B2
(45) Date of Patent: Dec. 30, 2014

(54) CONTROLLER FOR MANAGING A RESET OF A SUBSET OF THREADS IN A MULTI-THREAD SYSTEM

(75) Inventors: Kun Xu, Austin, TX (US); David B. Kramer, Cedar Park, TX (US); Marie J. Sullivan, Leander, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 241 days.

(21) Appl. No.: 13/445,582

(22) Filed: Apr. 12, 2012

(65) Prior Publication Data
US 2013/0275989 A1 Oct. 17, 2013

(51) Int. Cl.
*G06F 11/00* (2006.01)

(52) U.S. Cl.
USPC .............................. 714/17; 718/104

(58) Field of Classification Search
CPC ........................ G06F 11/1407; G06F 11/349
USPC ...................... 714/17, 16; 718/104
See application file for complete search history.

(56) References Cited

U.S. PATENT DOCUMENTS

| | | | |
|---|---|---|---|
| 7,496,790 B2 | 2/2009 | Arndt et al. | |
| 7,676,655 B2* | 3/2010 | Jordan | 712/214 |
| 7,725,685 B2 | 5/2010 | Floyd et al. | |
| 8,640,129 B2* | 1/2014 | Cismas et al. | 718/100 |
| 2006/0117316 A1* | 6/2006 | Cismas et al. | 718/103 |
| 2008/0115113 A1* | 5/2008 | Codrescu et al. | 717/127 |
| 2010/0257534 A1* | 10/2010 | Cismas et al. | 718/103 |

* cited by examiner

*Primary Examiner* — Dieu-Minh Le

(57) ABSTRACT

An integrated circuit device includes a processor core, and a controller. The processor core issues a command intended for a first thread of a plurality of threads. The controller initiates de-allocates hardware resources of the controller that are allocated to the first thread during a thread reset process for the first thread, returns a specified value to the processor core in response to the first command intended for the first thread during the thread reset process, drops responses intended for the first thread from other devices during the thread reset process, completes the thread reset process in response to a determination that all expected responses intended for the first thread have been either received or dropped, and continues to issue requests to other devices in response to commands from other threads of the plurality of threads and processing corresponding responses during the thread reset process.

21 Claims, 6 Drawing Sheets

CONTROLLER FOR MANAGING A RESET OF A SUBSET OF THREADS IN A MULTI-THREAD SYSTEM

FIELD OF THE DISCLOSURE

This disclosure generally relates multi-threaded systems and more particularly to managing a reset of an individual thread or a subset of threads in a multi-threaded system.

BACKGROUND

An integrated circuit (IC) device can have an input/output (I/O) controller that simultaneously provides multiple threads with access to one or more processor cores of the IC device. The I/O controller can be divided into multiple partitions with each of the multiple threads being allocated a respective partition. When an error is detected in one of the threads, a processor core may determine that the thread needs to be reset. Typically, this reset is implemented as a global reset of the entire I/O controller, including all of the partitions and threads. During the global reset all of the resources are de-allocated from the threads, and the I/O controller flushes out and drops all outstanding transactions associated with the one or more processor cores. Thus, a failure of one thread in a multi-threaded system results in an inefficient reset of all of the threads.

BRIEF DESCRIPTION OF THE DRAWINGS

The present disclosure may be better understood, and its numerous features and advantages made apparent to those skilled in the art by referencing the accompanying drawings.

DETAILED DESCRIPTION

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

FIGS. 1-8 illustrate embodiments of an integrated circuit (IC) device employing multiple processor cores and an I/O controller. The I/O controller can be any type of controller, but herein it will be referred to in a non-limiting way as an I/O controller. The I/O controller enables multiple threads to be executed concurrently by the processor cores. During operation of the IC device, the processor cores send commands for a thread to the I/O controller, which in turn transmits corresponding packets to an external device. The I/O controller then can receive response packets in the thread from the external device. When the thread needs to be reset, the processor core can issue a soft reset request for the thread. The I/O controller can detect the soft reset request and can perform the soft reset of the thread without having to reset the other threads. The I/O controller can continue to manage commands and responses associated with the other threads in the IC device during the soft reset of the thread. Also during the soft reset of the thread, the I/O controller can return a null value to the processor core in response to any command associated with the thread being reset, and can drop response packets associated with the thread being reset. When the thread soft reset has been completed, the I/O controller can indicate that the thread is ready for use by the processor core. This process can be implemented for more than one thread without affecting the remaining threads being executed by the processor cores.

Figure 1:
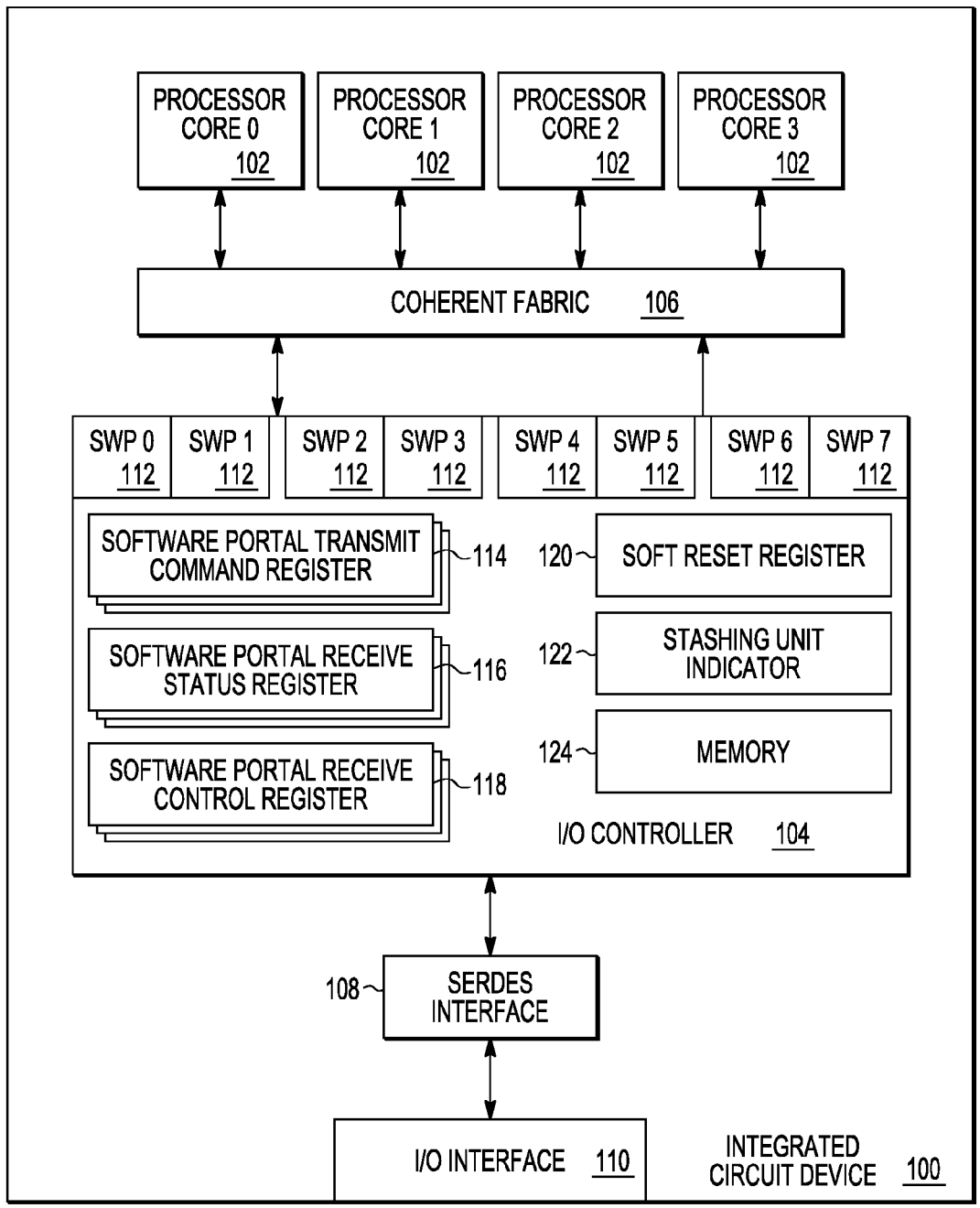
FIG. 1 illustrates an integrated circuit (IC) device implementing an input/output (I/O) controller configured to facilitate individual thread reset in accordance with at least one embodiment of the present disclosure.

FIG. 1 illustrates an integrated circuit (IC) device 100 in accordance with at least one embodiment of the present disclosure. The integrated circuit 100 includes multiple processor cores 102, an input/output (I/O) controller 104, a serializer/deserializer (SERDES) interface 108, and an I/O interface 110. The I/O controller 104 includes a plurality of software portals 112, multiple software portal transmit command registers (TCR) 114, multiple software portal receive status registers (RSR) 116, multiple software portal receive control registers (RCR) 118, a soft reset register (SRR) 120, a stashing unit indicator 122, and a memory 124. There can be a separate TCR 114, RSR 116, and RCR 118 for each of the software portals 112.

A software portal 112 can be a portion of the hardware resources of the I/O controller 104 allocated to a single thread. The TCR 114 can be a register to store a set of commands associated with a particular thread and received from the processor core 102 before the commands are executed in the I/O controller 104. The RSR 116 can be a register to store data and status information associated with a particular thread. The status information can be whether the data is ready to be accessed by the processor core, whether the thread is in a soft reset, a difference between a number of responses expected for a command and a number of responses associated the command received by the I/O controller, and the like. The RCR 118 can be a register to indicate whether responses intended for a particular thread can be received. In one embodiment, the SRR 120 is a single register shared by all of the threads, whereby each bit in the SRR 120 is associated with a different thread and the allocated software portal 112 for the thread in the I/O controller 104. Each of the processor cores 102 is in communication with the I/O controller 104 via the coherent fabric 106. The I/O controller 104 is in communication with the SERDES interface 108, which in turn is in communication with the I/O interface 110.

During a normal operation, a thread in the processor cores 102 issues a command for another device outside of the IC device 102. The processor core 102 sends the command and associated transmit data, via the coherent fabric 106, to the software portal 112 of the I/O controller 104 allocated to the thread. The I/O controller 104 stores the command in the TCR 114 and stores the transmit data associated with the command in a transmit data register. The I/O controller 104 creates a transmission packet using the command and the transmit data, and sends the transmission packet to the other device via the SERDES interface 108 and the I/O interface 110.

The I/O interface 110 then receives a response packet corresponding to the transmission packet from the other device, and provides the response packet to the I/O controller 104 via the SERDES interface 108. The I/O controller 104 unpacks the data found in the response packet, and stores the data in a receive data register associated with the thread. The I/O controller 104 also stores status information for the response packet in the RSR 114, such as information indicating whether all of the response data has been received and the like. When the I/O controller 104 has stored all of the data from the response packet in the receive data register, the data is provided to the thread of the processor cores 102. The process can then repeat as stated above, with the thread of the processor core 102 issuing a command to the I/O controller 104, which is stored in the TCR 114 as shown in FIG. 2.

Figure 2:
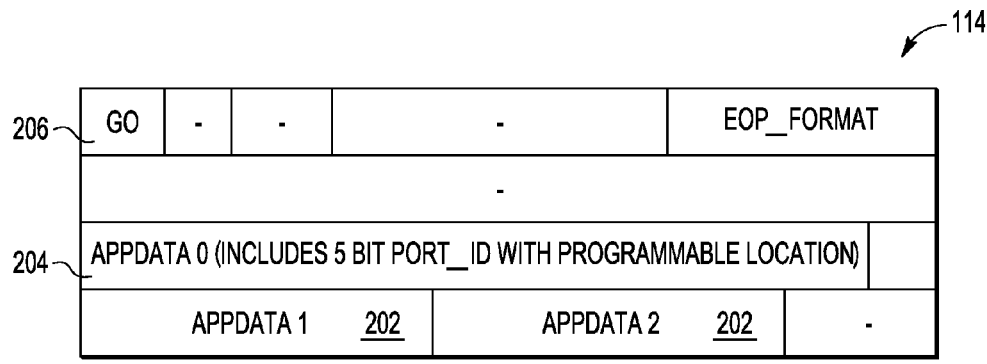
FIG. 2 illustrates a software portal transmit command register of an I/O controller of FIG. 1 in accordance with at least one embodiment of the present disclosure.

FIG. 2 illustrates the TCR 114 within the I/O controller 104 in accordance with at least one embodiment of the present disclosure. The TCR 114 includes a memory space 202, a software portal ID 204, and a GO bit 206. The memory space 202 stores command data associated with a particular thread. There can be different TCR 114 for each software portal 112, and the I/O controller 104 appends an ID number that is based on the address offset of the command as the software portal ID 204, which the I/O controller 104 stores in the TCR 114 to indicate the software portal 112 associated with the TCR 114. The GO bit 206 is set to indicate when the commands stored in the memory space 202 are ready to be executed by the I/O controller 104.

The TCR 114 can also include an end of packet (EOP) format field, which indicates how many bytes are valid in a highest order transmit data register (TDR) associated with the TCR 114. For example, a thread can write transmit data to multiple TDRs in a specific order, such as TDR2, then TDR0, and then TDR1. The thread can then set the Go bit 206 in the TCR 114 to indicate that all of the transmit data has been written. In this example, the EOP format field can indicate 16 bytes, which in turn indicates that all of the bytes are valid for TDR0 and TDR1, and that only 16 bytes in TDR2 are valid. Thus, the I/O controller 104 can use the EOP format field to determine the amount of transmit data associated with the thread. The processor core 102 can utilize the fields of the TCR 114 to store data and to issue commands in a thread associated with the particular TCR 114.

Referring back to FIG. 1, the I/O controller 104 can also store control data in the buffer of the memory 124 whenever there is a write to the memory space 202 of the TCR 114. The software portal 112 can use the control data and the packet data to generate a transmission packet. The I/O controller 104 can then move the transmission packet into an internal transmit packet queue to be translated and transmitted to the SERDES interface 108 in response to the GO bit 202 in the TCR 114 being set. The SERDES interface 108 sends the transmission packet to another device via the I/O interface 110, which can be a link interface, i.e., a high speed serial interface, or the like.

The SERDES interface 108 receives a response packet from the other device responding to the transmission packet, and provides the response packet to the I/O controller 104. The I/O controller 104 can store packet data and control data from the response packet in the RSR 116. When all of the packet data and the control data have been received with respect to the command issued by the thread, the stashing unit indicator 122 can write the received data in an address of the RSR 116 that is allocated to the I/O controller 104. The stashing unit indicator 122 then sends a stashing request to the processor core 102. If the processor core 102 accepts the stashing request, the thread writes the data stashed in the address of the RSR 116 to a cache of the processor core 102. The received data can be sent to the cache of the processor core 102 in response to the stashing unit indicator 122 so that the processor core 102 can access the data in the cache of the processor core 102, which is quicker than accessing the received data in the I/O controller 104. However, if the processor core 102 does not accept the stashing request, the stashed data is provided to the I/O controller 104 instead of the cache of the processor core 102. When the I/O controller 104 receives the received data, the I/O controller 104 sets RDY bit 302 in the RSR 116, as shown in FIG. 3, allocated to the software portal 112 associated with the thread.

Figure 3:
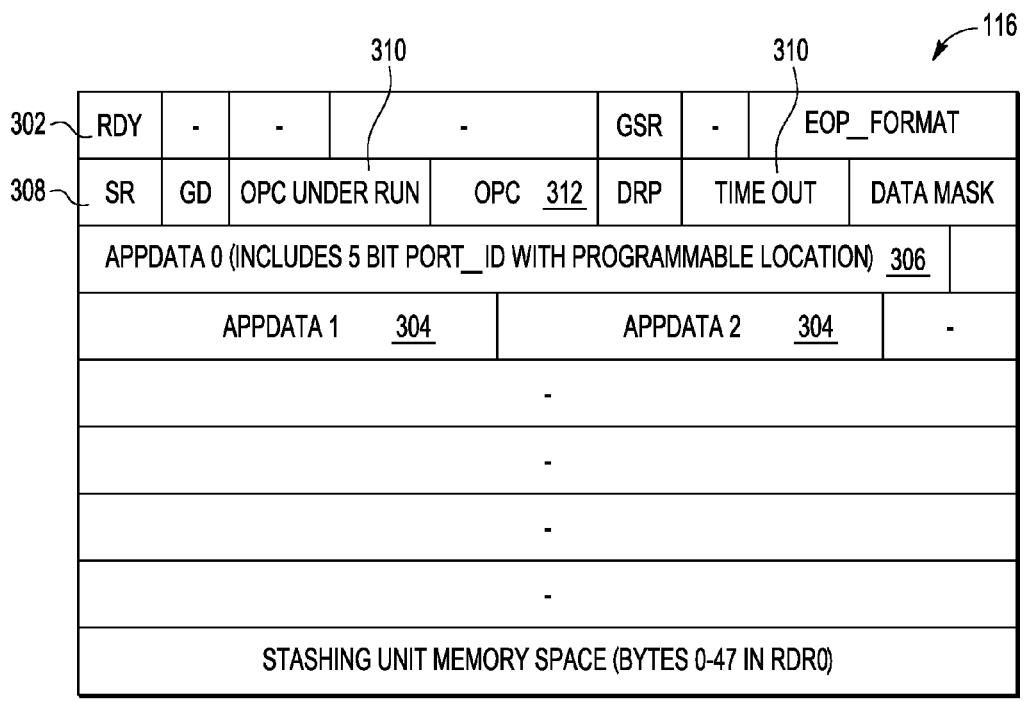
FIG. 3 illustrates a software portal receive status register of the I/O controller of FIG. 1 in accordance with at least one embodiment of the present disclosure.

FIG. 3 illustrates the RSR 116 including the RDY bit 302, memory space 304, portal ID 306, soft reset (SR) bit 308, outstanding packet counter (OPC) under-run value 310, OPC value 312, and a time-out 314 in accordance with at least one embodiment of the present disclosure. The RDY bit 302 is set to indicate that data stored in the RSR 116 is ready to be retrieved by the processor core 102. The memory space 304 can store data within a response to a command received in the I/O controller 104 from the SERDES 108. The software portal ID 306 can indicate the software portal 112 associated with the RSR 116. The SR bit 308 is set to indicate that the I/O controller 104 is resetting the thread associated with the RSR 116. The OPC under-run value 310 indicates whether the I/O controller 104 detects an under-run of the OPC while the I/O controller 104 is resetting the thread associated with the RSR 116.

The OPC value 312 represents a difference between a number of responses expected for a command associated with the thread of the RSR 116 and a number of responses intended for the thread actually received by the I/O controller 104 from the SERDES 108. The time-out 314 is set to indicate that a specific period of time has elapsed before the number of responses expected for all of the commands associated with the thread of the RSR 116 equals the number of responses intended for the thread actually received, during the thread reset process, by the I/O controller 104 from the SERDES 108.

The RSR 116 also includes a global soft reset (GSR) field, an EOP format field, a global done (GD) field, a drop (DRP) field, data mask field, and a portion of a receive data register available for the stashing unit indicator 122. The GSR field can indicate when the I/O controller 104 initiates a global reset of all of the threads in the I/O controller 104. The RSR 116 can also include an end of packet (EOP) format field, which indicates how many bytes are valid in a highest order receive data register (RDR) associated with the RSR 116. For example, the I/O controller 104 can write data received in a response packet to multiple RDRs in a specific order, such as RDR2, then RDR0, and then RDR1. The I/O controller can then set the RDY bit 302 RSR 116 to indicate that all of the received data has been written to the RDRs. In this example, the EOP format field can indicate 24 bytes, which in turn indicates that all of the bytes are valid for RDR0 and RDR1, and that only 24 bytes in RDR2 are valid. Thus, the processor core 102 can use the EOP format field to determine the amount of received data associated with the thread.

The GD field indicates that the global reset of all of the threads in the I/O controller 104 is completed. The DRP field indicates to the processor core 102 that a transmit packet has been dropped. The data mask field indicates how many bytes of data are included in a response packet associated with the thread of the RSR 116. The portion of a receive data register available for the stashing unit indicator 122 is set such that if the amount of data received from the SERDES interface 108 under a particular size the data can be stashed into a cache in the processor core 104 for quicker access by the processor core 102. There can be a different RSR 116 for each software portal 112. The I/O controller 104 can increment the OPC value 312 in response to receiving a command for a thread from the processor core 102, which is indicated by the GO bit 206 of the TCR 114 being set. The I/O controller 104 can decrement the OPC value 312 in response to the processor core clearing the RDY bit 302 of the RSR 116.

Referring back to FIG. 1, when the processor core 102 has received the packet data, the processor core 102 can clear the RDY bit 302 in the RSR 116. The I/O controller 104 can detect that the RDY bit 302 has been cleared and in response can load a next response data packet and next control data into the RSR 116 to be accessible by the corresponding software portal 112 and the processor core 102.

At any point during operation, one of the processor cores 102, which is a managing processor core 102, may determine that a thread assigned to another one of the processor cores 102 needs to be reset for any of a variety of reasons, such as an invalid instruction, a hardware problem associated with the thread, or the like. The managing processor core 102 controls the operation of the other processor cores 102. The managing processor core 102 initiates resetting the thread by setting a SR bit in the SRR 120 that corresponds to the thread that needs to be reset. In one embodiment, the SRR 120 is a single register shared by all of the threads, whereby each bit in the SRR 120 is associated with a different thread and the allocated software portal 112 for the thread in the I/O controller 104.

When the I/O controller 104 detects that the SR bit in the SRR 120 corresponding to a particular thread is set, and the I/O controller 104 initiates a reset of the thread and allocated software portal 112. The I/O controller 104 can reset the thread and software portal 112 by de-allocating resources in the I/O controller 104 associated with the thread being reset, e.g., de-allocating memory space in the memory 124, de-allocating a queue for storing pointers to memory spaces in the memory for the data associated with the thread, de-allocating static random access memory (SRAM) space, and the like.

During the reset process, the processor core 102 continues to issue commands until the processor core 102 detects that the thread is being reset, such that the I/O controller 104 receives commands associated with the thread during the reset process. Also, other devices continue to send response packets corresponding to a transmit packet to the I/O controller 104 via the SERDES 108 since the other devices do not detect whether the thread is being reset. Therefore, the I/O controller 104 can return a value of zero or a null value in response to software portals reads from the processor core 102 and can drop software portal writes from the processor core 102 except for reads and writes to the RSR 116 from the processor core 102. The I/O controller 104 continues to allow reads from the processor core 102 to the RSR 116 because the reads the OPC value 312 to determine whether the reset of the thread has been completed. Also, the I/O controller 104 allows reads and writes to the RSR 116 to store and read update status information for the thread associated with the RSR 116. For example, the SR bit 308, the OPC under-run value 310, the OPC value 312, and the time out 314 can be updated during the thread reset process to indicate a state of the thread reset process and whether a reset of the I/O controller 104 is needed. The I/O controller 104 utilizes the portal ID of the read/write commands to detect that the read/write command is associated with the thread and software portal 112 that is being reset. The I/O controller 104 continues to perform the normal operations disclosed above for the remaining threads that are not being reset during the reset of the thread.

While the I/O controller 104 is in the process of resetting the thread, the I/O controller 104 stops setting the RDY bit 302 in the RSR 116 associated with the thread when data packets for the software portal 112 are received from the SERDES interface 108. The I/O controller 104 drops the received response packets associated with the software portal 112 being reset, and decrements the OPC value 312 of RSR 116 in response to reach dropped response packet.

The processor core 102 can poll the OPC value 312 of the RSR 116 associated with the reset thread to receive a current outstanding packet count for the thread. If the OPC value 312 does not equal zero, the processor core 102 can issue a data cache block flush (DCBF) to flush a cache buffer first-in first-out (FIFO) queue, such that a next response can be received for the thread and software portal 112 being reset. The thread and software portal 112 may have multiple outstanding response packets already stored in the memory 124 or the SRAM the I/O controller 104, which need to be flushed before the I/O controller 104 can complete the reset of the thread. Thus, the cache buffer FIFO queue needs to be flushed before the next data can be retrieved from the memory 124 or SRAM. When the cache buffer FIFO queue has been flushed, the processor core 102 can send another read request for the OPC value 312 of the RSR 116.

The I/O controller 104 can also determine whether the OPC value 312 is less than zero, which indicates that the I/O controller 104 has received more responses associated with the thread than commands. The I/O controller 104 can determine that an OPC under-run has occurred in response to the OPC value 312 being less than zero. The I/O controller 104 can set the OPC under-run value 310 in response to the OPC bit 208 being less than zero, and can issue a global reset of the I/O controller 104. The I/O controller 104 can issue a global reset in response to the OPC under-run, because the OPC under-run can indicate that there is a problem/error with the I/O controller 104.

The I/O controller 104 can also monitor the OPC value 312 to determine whether the OPC value 312 stays above zero for an extended period of time. If the OPC value 312 stays above zero for the extended period of time (thereby indicating that an expected number of responses for the given command have not been received from the SERDES interface 108), the I/O controller 104 can set an OPC time out bit 314 in the RSR 116. The OPC time out can indicate that there is a problem with the I/O controller 104, and can indicate a global reset of the I/O controller 104.

Figure 4:
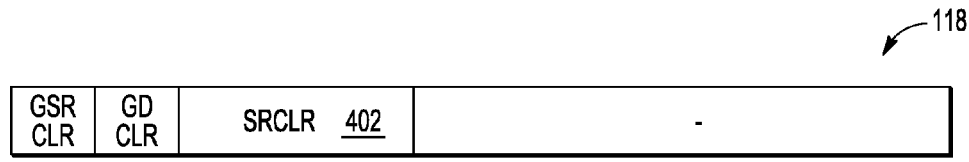
FIG. 4 illustrates a software portal receive control register of the I/O controller of FIG. 1 in accordance with at least one embodiment of the present disclosure.

When the reset is complete, the processor core 102 can set the SRCLR bit 402 of the RCR 118, as shown in FIG. 4, associated with the thread and the software portal 112. The RCR 118 also includes a GSR CLR bit and a GD CLR bit. The processor core 102 sets GSR CLR bit when a global reset of the I/O controller 104 is done, which causes the GSR field in the RSR 116 to be cleared. The processor core 104 sets the GD CLR when a global reset of the I/O controller 104 is initiated, which causes the GD field of the RSR 116 to clear. When the OPC value 312 equals zero, the I/O controller 104 can clear the SR bit in the SRR register 120 corresponding with the thread that has been reset, which in turn informs the managing processor core 102 that the soft reset is complete. The processor core 102 determines that the thread reset process is complete in response to the I/O controller setting the OPC value 312 equal to zero. The processor core 102 can then issue a new transmit command for the thread. The processor core 102 and the I/O controller 104 then can return to a normal operation for all of the threads handled in the I/O controller 104.

Figure 5:
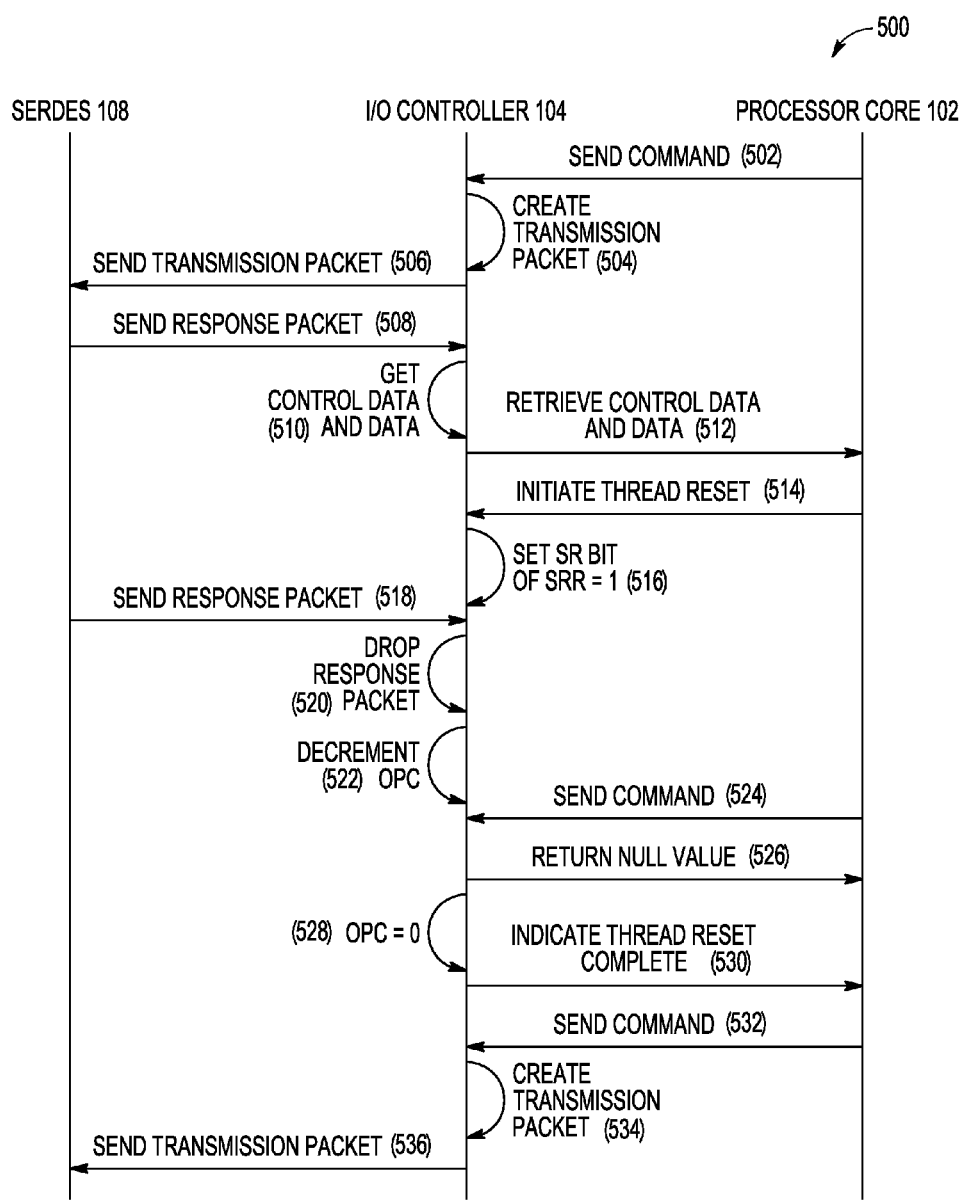
FIG. 5 illustrates timing diagram associated with the IC device of FIG. 1 in accordance with at least one embodiment of the present disclosure.

FIG. 5 illustrates a sequence diagram 500 depicting an operation of the IC device 100 of FIG. 1 in accordance with at least one embodiment of the present disclosure. During process 502, the processor core 102 sends a command with control data and packet data to the I/O controller 104. During process 504, the I/O controller 104 creates a transmission packet using the control data and the packet data received from the processor core 102. The I/O controller 104 sends the transmission packet to the SERDES interface 108 during process 506. The SERDES interface 108 then provides the transmission packet to another device for processing.

During process 508, the SERDES interface 108 receives a response packet from the other device in response to the transmission packet and provides the response packet to the I/O controller 104. The response packet includes status information and packet data corresponding to the transmission packet. The I/O controller 104 removes the status information and the packet data from the response packet during process 510. During process 512, the core processor 102 retrieves the status information and the packet data from the I/O controller 104. During process 514, a managing processor core 102 initiates a thread reset in response to a detected error or other event necessitating a reset. The managing processor core 102 initiates the thread reset by setting the SR bit in the SRR 120 associated with the thread during process 516.

The transmission packet output during the process 506 may trigger the generation of multiple response packets, or multiple transmission packets may be in flight when the thread reset is initiated. For example, during process 518 a second response packet associated with the previous transmission packet may be relayed by the SERDES interface 108 to the I/O controller 104. In response to determining that the second response packet is associated with the thread being reset based on the software portal ID of the response packet, the I/O controller 104 drops the second response packet during process 520. During process 522, the I/O controller 104 decrements the OPC value 312 of the RSR 116 in response to the response packet being dropped.

During process 524, the processor core 102 send a command associated with the software portal 112 of the thread being reset to the I/O controller 104. In response to determining the command is directed to the thread being reset, the I/O controller 104 returns a value of zero or a null value to the processor core 102 for the command during process 526. The I/O controller 104 sets the OPC value 312 equal to zero in response to the number of response packets for the thread being reset received from the SERDES interface 108 equaling the expected number of response packets for the thread being reset during process 528.

During process 530, the processor core 102 detects that the thread reset is complete by polling the OPC value 312 and determining that the OPC value 312 is zero. The processor core 102 sends a command with control data and packet data to the I/O controller 104 in response to the reset being completed during process 532. During process 534, the I/O controller 104 creates a transmission packet using the control data and the packet data. The I/O controller 104 then sends the transmission packet to the SERDES interface 108 during process 536.

Figure 6:
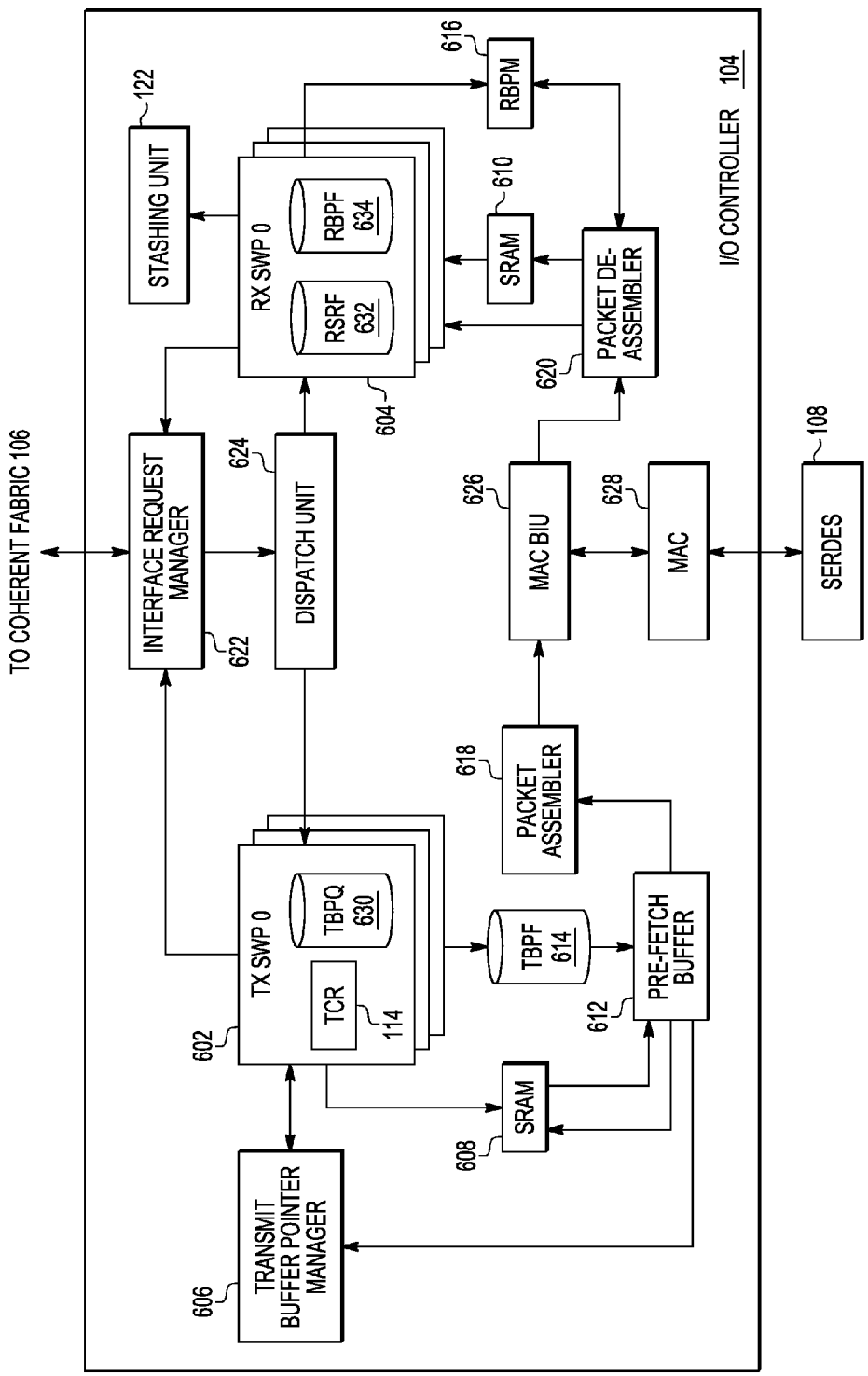
FIG. 6 illustrates an implementation of the I/O controller of FIG. 1 in accordance with at least one embodiment of the present disclosure.

FIG. 6 illustrates an exemplary implementation of the I/O controller 104 of FIG. 1 in accordance with at least one embodiment of the present disclosure. The I/O controller 104 includes transmit (TX) software portal control logic 602, receive (RX) software portal control logic 604, a transmit buffer point manager (TBPM) 606, SRAMs 608 and 610, a pre-fetch buffer 612, and a transmit buffer pointer FIFO (TBPF) 614. The I/O controller 104 also includes a receive buffer pointer manager (RBPM) 616, a packet assembler 618, a packet de-assembler 620, an interface request manager 622, a dispatch unit 624, a medium access control (MAC) block interface unit (BIU) 626, a MAC 628, a transmit buffer pointer queue (TBPA) 630, a receive status register FIFO (RSRF) 632, and a receive buffer pointer FIFO (RBPF) 634. The I/O controller 104 can include a separate TX software portal control logic 602 and a separate RX software portal control logic 604 for each software portal 112.

The TX software portal control logic 602 includes an input terminal, an I/O terminal, and first, second, and third output terminals. The RX software portal control logic 604 includes first, second, and third input terminals, and first, second, and third output terminals. The TBPM 606 includes an input terminal, and an input/output terminal coupled to the input/output terminal of the TX software portal control logic 602. The SRAM 608 includes a first input terminal, a second input terminal coupled to the second output terminal of the TX software portal control logic 602, and an output terminal. The SRAM 610 includes an input terminal, and an output terminal coupled to the first input terminal of the RX software portal control logic 604. The pre-fetch buffer 612 includes a first output terminal coupled to the input terminal of the TBPM 606, a second output terminal coupled the input terminal of the SRAM 608, a first input terminal coupled to the output terminal of the SRAM 608, a second input terminal, and a third output terminal. The TBPF 614 includes an input terminal coupled to the first output terminal of the TX software portal control logic 602, and an output terminal coupled to the second input terminal of the pre-fetch buffer 612.

The RBPM 616 includes an input terminal coupled to the third output terminal of the RX software portal control logic 604, and an input/output terminal. The packet assembler 618 includes an input terminal coupled to the third output terminal of the pre-fetch buffer 612, and an output terminal. The packet de-assembler 620 includes a first input terminal, a first output terminal coupled to the second input terminal of the RX software portal control logic 604, a second output terminal coupled to the input terminal of the SRAM 610, and an input/output terminal coupled to the input/output terminal of the RBPM 616.

The interface request manager 622 includes a first input terminal coupled to the second output terminal of the TX software portal control logic 602, a second input terminal coupled to the third output terminal of the RX software portal control logic 604, an input/output terminal coupled to the coherent fabric 106, and an output terminal. The dispatch unit 624 includes an input terminal coupled to the output terminal of the interface request manager 622, a first output terminal coupled to the input terminal of the TX software portal control logic 602, and a second output terminal coupled to the third input terminal of the RX software portal control logic 604. The MAC BIU 626 includes an input terminal coupled to the output terminal of the packet assembler 618, an output terminal coupled to the first input terminal of the packet de-assembler 620, and an input/output terminal. The MAC 628 includes a first input/output terminal coupled to the input/output terminal of the MAC BIU 626, and a second input/output terminal coupled to the SERDES interface 108.

The I/O controller 104 can include N*M partitioned software portals 112, whereby N is the number of processor cores 102 in the IC device 100 and M is a number of threads facilitated by the I/O controller 102. Each software portal 112 is allocated a private a memory space in the memory 124, allocated its own dedicated software portal control logic 602 and 604, allocated a portion of the TBPQ 630, allocated its own dispatch logic in the dispatch unit 624, and allocated a share of SRAMs 608 and 610, such that each thread can transmit/receive packets without interfering with a transmission/reception of another thread. During operation, each thread can independently send data out in transmission packets according to transmit commands from the processor core 102, or can receive data packets and status information in response packets associated with to the transmission packets. The I/O controller 104 can receive commands from the processor core 102 via the coherent fabric 106 and the interface request manager 622. The dispatch unit 624 can then receive the command from the interface request manager 622, and can dispatch the command to a corresponding software portal 112 according to an address or portal ID associated with the command.

When the transmit software portal control logic 602 receives a dispatch request from the dispatch unit 624, the TX software portal control logic 602 can acquire a buffer pointer from the TBPM 606 and store the buffer pointers in the TBPQ 630. The buffer pointer points to a memory location in the SRAM 608 available to store a transmit data packet and control data associated with a transmit command from the processor 102. The TX software portal control logic 602 can write the data in the TCR 114, which can be an allocated portion of the SRAM 608. When all of the control data is written into the TCR 114 and the GO bit 202 is set, the TX software portal control logic 602 can push the buffer pointers from the TBPQ 630 associated with the data packets into the TBPF 614. The TBPF 614 can be shared between each of the software transmit logic portions 602, such that the TBPF 614 can receive buffer pointers from each of the software portals 112, and the buffer pointers associated with each TX software portal control logic 602 can be executed in the order that they are received from each TX software portal control logic 602.

The pre-fetch buffer 612 can receive and store the data packets as they are read out of the SRAM 608 in response to the buffer pointers being read out of the TBPF 614. After a buffer pointer is use to retrieve a data packet from the SRAM 608, the pre-fetch buffer 612 releases the buffer pointer back the TBPM 606 for later use by another TX software portal control logic 602. When the MAC 628 is ready to accept a transmit control packet and a data packet, the packet assembler reads data and control data out of the pre-fetch buffer 612, assembles the data and control data into a transmission packet, tags the data with a software portal ID, and then sends the transmission packet to the MAC 628 via the MAC BIU 626. The MAC 628 then sends the transmission packet to the SERDES interface 108, which in turns sends the data packet from the IC device 100 to another device via the I/O interface 110 of FIG. 1.

The SERDES interface 108 can then receive a response packet from another IC, and can then send the response packet to the MAC 628. The MAC 628 then sends the response packet to the packet de-assembler 620 via the MAC BIU 626. The packet de-assembler 620 can de-assembled the response packet into status information and received data. The RX software portal control logic 604 can acquire a different buffer pointer from the RBPM 616 for every 64 bytes of data. The RX software portal control logic 604 can then push the buffer pointers into the RBPF 634 of the corresponding software portal 112 based on the portal ID of the received data. The RX software portal control logic 604 can push the status information into the RSRF 632.

When stashing is enabled for the processor core 102, the first 32 bytes of received data can be stash to a corresponding core cache via the stashing unit indicator 122, such that the processor core 102 thread can quickly access the status information and response data. The processor core 102 thread can issue more commands if more response data is needed. After the processor core 102 receives the data, the processor core 102 can clear the RDY bit 302 in the RSR 116 of FIG. 1, so that the RX software portal control logic 604 can load a new response status information and response data into the corresponding software portal 112.

As discussed above with respect to FIG. 1, when a thread and corresponding software portal 112 are reset, the I/O controller 104 can drop outstanding responses associated with the thread being reset based on the portal ID of the response packet, and can continue to process the response packets associated with the other threads. When the I/O controller 104 drops a packet during a soft reset of a thread, the I/O controller 104 can perform the same reset steps as described above with respect to FIGS. 1-5, such as decrementing the OPC 308 in the RSR 116. When the OPC 308 associated with the thread and software portal 112 in soft reset is decremented, the buffer pointer previously acquired by the software portal 112 from the TBPM 606 and/or the RBPM 616 can be immediately released back to the TBPM 606 and/or the RBPM 616 so that the buffer pointer can be used by other software portals 112. Also, during the reset of the thread, the I/O controller 104 can flush the data stored in SRAMs 608 and 610 that is associated with the thread being reset.

Figure 7:
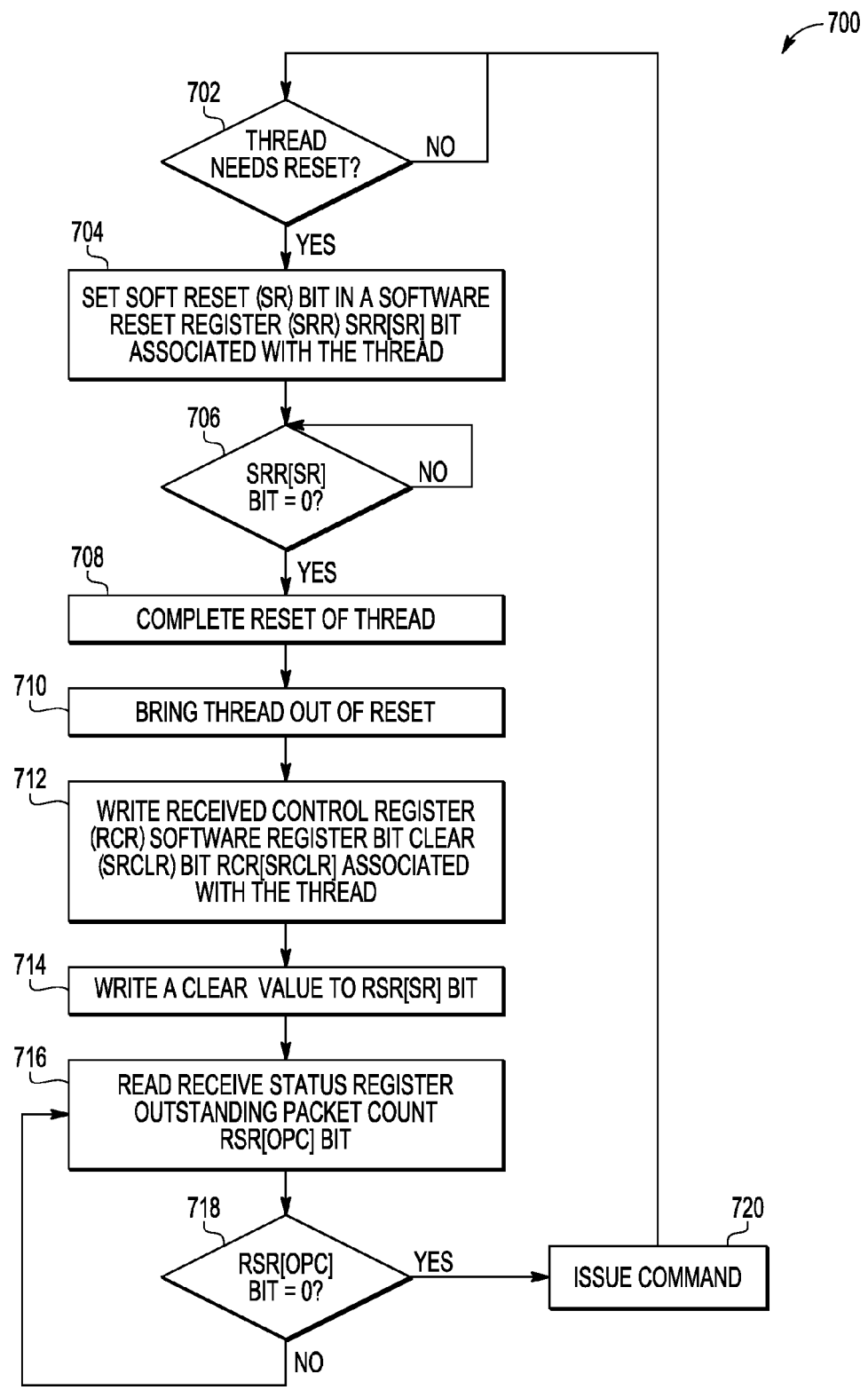
FIG. 7 illustrates a method of initiating and recovering from a thread reset in the IC device of FIG. 1 in accordance with at least one embodiment of the present disclosure.

FIG. 7 illustrates a method 700 of initiating and recovering from a thread reset in the integrated circuit 100 in accordance with at least one embodiment of the present disclosure. At block 702, the processor core 102 determines that a thread needs to be reset. A managing processor core 102 sets a SR bit in the SRR 120 associated with the thread to be reset at block 704. At block 706, the managing processor core 102 determines whether the SR bit in the SRR 120 has been cleared. The I/O controller 104 can clear the SR bit in the SRR 120 when the I/O controller 104 has completed a hardware clean-up associated with the thread reset. The hardware clean-up performed by the I/O controller can include de-allocating hardware resources associated with the thread, such as queues, memory, i.e., SRAM, space, and the like. When the SR bit in the SRR 120 is cleared, the processor core 102 can completed the reset of the thread at block 708. In another embodiment, the processor core 102 can complete the thread reset without verifying that the SR bit of the SRR 120 associated with the thread is cleared.

The processor core 102 brings the thread out of reset at block 710. At block 712, the processor core 102 sets the SRCLR bit 402 of the RCR 118 associated with the reset thread. The processor core 102 then write a clear state the SR bit 304 of the RSR 116 in response to the SRCLR bit 402 being set at block 714. At block 716, the processor core 102 reads the OPC value 312 of the RSR 116. The processor core 102 determines whether the OPC value 312 of the RSR 116 equals zero at block 718 (i.e., whether there are no more outstanding responses expected for the thread). If the OPC value 312 of the RSR 116 does not equal zero, the flow continues as stated above at block 716. If the OPC value 312 of the RSR 116 does equal zero, the processor core 102 can issue a command associated with the thread at block 720 for processing.

Figure 8:
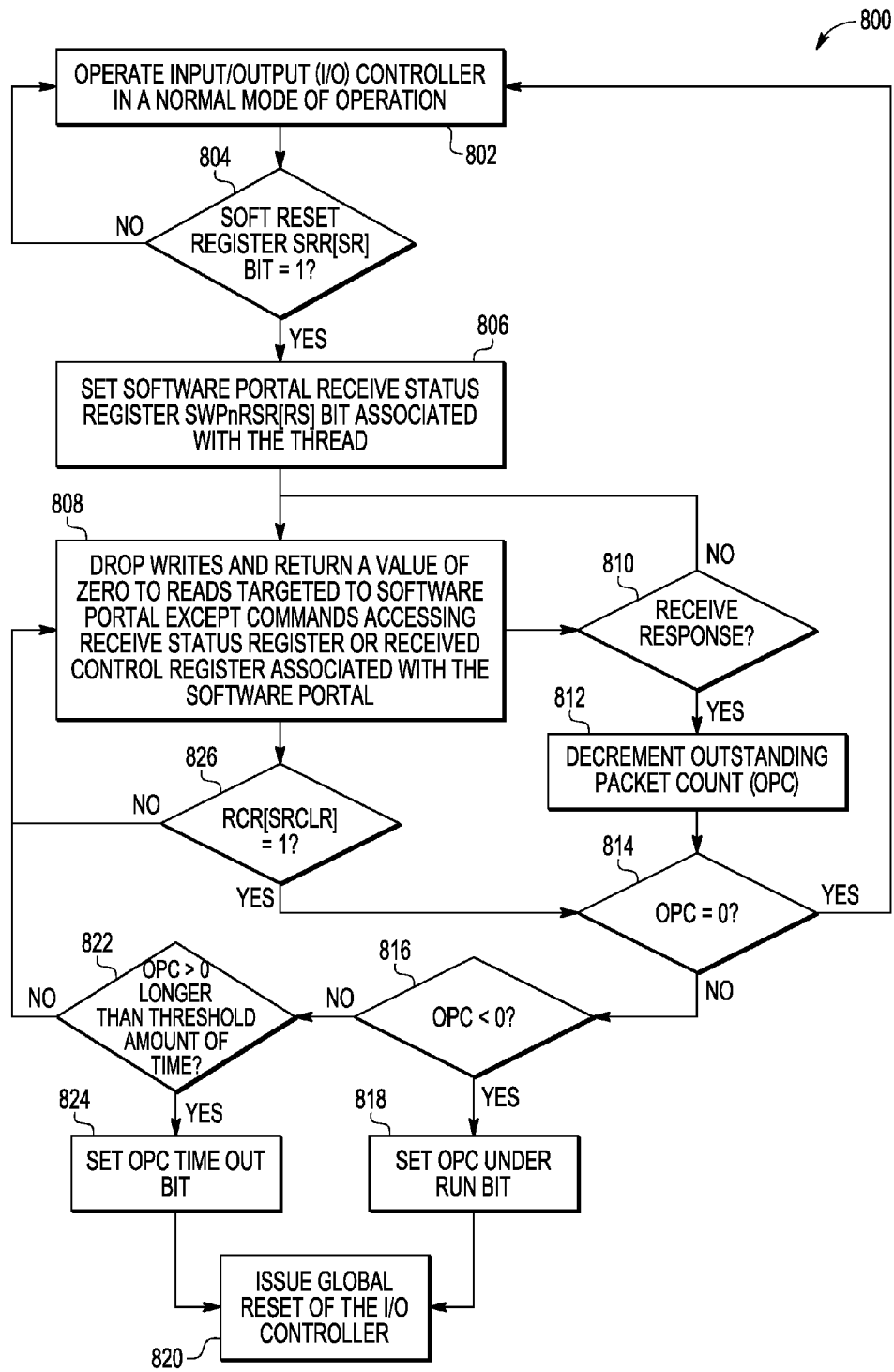
FIG. 8 illustrates a method of controlling a thread reset in the I/O controller of FIG. 1 in accordance with at least one embodiment of the present disclosure.

FIG. 8 illustrates a method 800 of controlling a thread reset in the I/O controller 104 of FIGS. 1 and 6 in accordance with at least one embodiment of the present disclosure. At block 802, the I/O controller 104 is operating in a normal mode of operation for each of the multiple threads. The I/O controller 104 determines whether the SR bit in the SRR 120 associated with a particular thread is set at block 804. If the SR bit in the SRR 120 is not set, the I/O controller continues to operate in the normal mode of operation for each of the multiple threads and the flow continues as stated above at block 802. If the SR bit in the SRR 120 is set, the I/O controller 104 sets the RS bit 308 of the RSR 116 associated with the thread at block 806. At block 808, the I/O controller 104 drops writes and returns a value of zero or null in response to the reads targeted to a software portal 112 allocated to the thread, except for reads/writes accessing the RSR 116 or the RCR 118 associated with the software portal 112. The I/O controller 104 allows reads and writes to the RSR 116 to store and read update status information for the thread associated with the RSR 116. For example, the SR bit 308, the OPC under-run value 310, the OPC value 312, and the time out 314 can be updated during the thread reset process to indicate a state of the thread reset process and whether a reset of the I/O controller 104 is needed. The I/O controller 104 can differentiate between the different threads in the I/O controller 104 based on a software address offset associated with a portal ID in a header of a data packet for a given thread.

The I/O controller 104 determines whether a response packet has been received at block 810. If a response packet has not been received, then the flow continues as stated above at block 808. However, if a response has been received, the I/O controller 104 decrements the OPC value 312 in the RSR 118 associated with the software portal 112 of the thread at block 812. At block 814, the I/O controller 104 determines whether the OPC value 312 is equal to zero. If the OPC value 312 is equal to zero the flow continues with the I/O controller 104 operating in a normal mode of operation as state above at block 802. However, if the OPC value 312 is not equal to zero, the controller 104 determines whether the OPC value 312 is less than zero at block 816. If the OPC value 312 is less than zero, the I/O controller 104 detects an OPC under-run and sets the OPC under-run value 310 at block 818. At block 820, the I/O controller 104 issues a global reset of the I/O controller 104.

If the OPC value 312 is not less than zero, the I/O controller 104 determines whether the OPC value 312 has been greater than zero for longer than a specific amount of time at block 822. If the OPC value 312 has been greater than zero for longer than the specific amount of time, the I/O controller 104 sets the time out bit 314 in the RSR 116 at block 822. The I/O controller then issues a global reset of the I/O controller 104. However, if the OPC value 312 has not been greater than zero for longer than the specific amount of time, the flow continues as state above at block 808. At block 826, the controller 104 determines whether the SRCLR bit 402 in the RCR 118 is set. If the SRCLR bit 402 is set, the flow continues as stated above at block 814. However, if the SRCLR bit 402 is not set, the flow continues as stated above at block 808.

Based upon the description herein, it will be appreciated that the preceding detailed description is, therefore, not intended to be limited to the specific forms set forth herein, but on the contrary, it is intended to cover such alternatives, modifications, and equivalents, as can be reasonably included within the scope of the appended claims.

What is claimed is:

1. A method of managing a reset of a first thread of a plurality of threads executed in an integrated circuit (IC) device, the method comprising:
   initiating a thread reset process for the first thread in response to detecting a reset request for the first thread, the thread reset process comprising de-allocating hardware resources of a controller that are allocated to the first thread, returning a specified value from the controller to a processor core of the IC device in response to a first command intended for the first thread, and dropping responses intended for the first thread from other devices;
   completing the thread reset process in response to determining that all expected responses intended for the first thread have been either received or dropped; and
   continuing to issue requests to other devices in response to commands from other threads of the plurality of threads and processing corresponding responses during the thread reset process.

2. The method of claim 1, further comprising:
   detecting an under-run event associated with the first thread, wherein the under-run event indicates that a number of the responses intended for the first thread received by the controller exceeds a number of the expected responses intended for the first thread; and
   initiating a reset of the controller in response to the detected under-run event.

3. The method of claim 1, further comprising:
   issuing a time out event for the thread reset process in response to determining that a specified period of time has elapsed prior to when all of the expected responses intended for the first thread have been received; and
   initiating a reset of the controller in response to the time out event.

4. The method of claim 1, further comprising:
   returning a value of a first register within the controller to the processor core in response to a second command for the first thread, wherein the second command is directed to the first register and the first command is directed to a second register within the controller.

5. The method of claim 1, wherein the thread reset process comprises:
   decrementing a value stored in a register of the controller that is associated with the first thread in response to each dropped response intended for the first thread; and
   determining all expected responses intended for the first thread have been either received or dropped comprises determining the value stored in the register has been decremented to a predetermined value.

6. The method of claim 1, wherein performing the reset comprises:
   flushing data associated with the first thread from a memory in the controller.

7. The method of claim 1, wherein the controller is an input/output controller.

8. The method of claim 1, wherein the reset request is received from a managing processor core.

9. A method of managing a soft reset of a first thread of a plurality of threads executed in an integrated circuit (IC) device, the method comprising:
   receiving, at a controller, a first command associated with the first thread from a processor core in the IC device;
   sending a first transmission packet associated with the first command to another device in communication with the IC device;

receiving a first response packet associated with the first transmission packet from the another device;

sending response data within the response packet to the processor core;

initiating a thread reset process for the first thread in response to detecting a reset request for the first thread, the thread reset process comprising de-allocating hardware resources of a controller that are allocated to the first thread, dropping additional response packets associated with the first transmission packet from the another device, decrementing a counter associated with the first thread in response to dropping each of the additional response packets, returning a specified value from the controller to the processor core in response to a second command intended for the first thread, completing the thread reset process in response to determining that the counter is equal to a predetermined value, and continuing to issue requests to other devices in response to commands from other threads of the plurality of threads; and receiving, at the controller, a third command associated with the first thread from the processor core after the thread reset process is completed; and sending a second transmission packet associated with the second command to the another device.

10. The method of claim 9, further comprising:

detecting an under-run event associated with the first thread, wherein the under-run event indicates that a number of the responses intended for the first thread received by the controller exceeds a number of the expected responses intended for the first thread; and initiating a reset of the controller in response to the detected under-run event.

11. The method of claim 9, further comprising:

issuing a time out event for the thread reset process in response to determining that a specified period of time has elapsed prior to when all of the expected responses intended for the first thread have been received; and initiating a reset of the controller in response to the time out event.

12. The method of claim 9, wherein the thread reset process further comprises:

returning a value of a first register within the controller to the processor core in response to a fourth command for the first thread, wherein the fourth command is directed to a read request of the first register and the second command is directed to a read request of a second register within the controller.

13. The method of claim 9, wherein the counter is equal to a predetermined value when all expected responses intended for the first thread have been either received or dropped.

14. An integrated circuit (IC) device comprising:

at least one processor core, the processor core to issue commands intended for a plurality of threads; and a controller in communication with the processor core, the controller to initiate thread reset processes for threads in response to detected reset requests for the threads, the controller to de-allocate hardware resources of the controller that are allocated to a thread being reset during a thread reset process, the controller to return a specified value to the processor core to issue the commands to the thread in response to a command intended for the thread being reset during the thread reset process, the controller to drop responses intended for the thread being reset from other devices during the thread reset process, and the controller to complete the thread reset process in response to a determination that all expected responses intended for the thread being reset have been either received or dropped, during the thread reset of the thread the controller to issue requests to other devices in response to commands from other threads of the plurality of threads and the controller to process corresponding responses.

15. The IC device of claim 14, the controller during the reset process further to return a value of a register within the controller to the processor core to issue the commands in response to a second command for the thread, wherein the second command is directed to a read request of the register and the command is directed to a read request of another register within the controller.

16. The IC device of claim 14, wherein the controller comprises:

a memory to store data associated with the thread, the controller to flush data associated with the thread being reset from the memory during the thread reset process of the thread.

17. The IC device of claim 14, the controller to detect an under-run event associated with the thread being reset, wherein an under-run event indicates that a number of the responses intended for the thread being reset received by the controller exceeds a number of the expected responses intended for the thread being reset, and the controller to initiate a reset of the controller in response to the detected under-run event.

18. The IC device of claim 14, the controller further to issue a time out event for the thread reset process in response to determining that a specified period of time has elapsed prior to when all of the expected responses intended for the thread being reset have been received, and the controller to initiate a reset of the controller in response to the time out event.

19. The IC device of claim 14, wherein the controller comprises:

a register associable with the thread being reset to store a value indicating a difference between a number of expected responses intended for the thread being reset and a number of received or dropped responses intended for the thread being reset, the controller further to decrement a value stored in the register in response to each received or dropped response intended for the thread being reset.

20. The IC device of claim 19, a processor core of the at least one processor cores to issue read commands for values stored the register, and the processor core to determine that the thread reset process of the thread being reset is complete in response to a value stored in the register being equal to a predetermined value.

21. The IC device of claim 14, the controller further to reset multiple threads of the plurality of threads without affecting remaining threads of the plurality of threads.

* * * * *